April 13, 1965 J. G. DEMKO 3,178,715

TIMING CIRCUIT

Filed Nov. 24, 1961

INVENTOR.
JOHN G. DEMKO

BY E. A. Petko

ATTORNEY

United States Patent Office
3,178,715
Patented Apr. 13, 1965

3,178,715

TIMING CIRCUIT

John G. Demko, Red Bank, N.J., assignor to Electronic Associates Inc., Long Branch, N.J., a corporation of New Jersey Filed Nov. 24, 1961, Ser. No. 154,469
6 Claims. (Cl. 346—29)

Figures 1, 2:
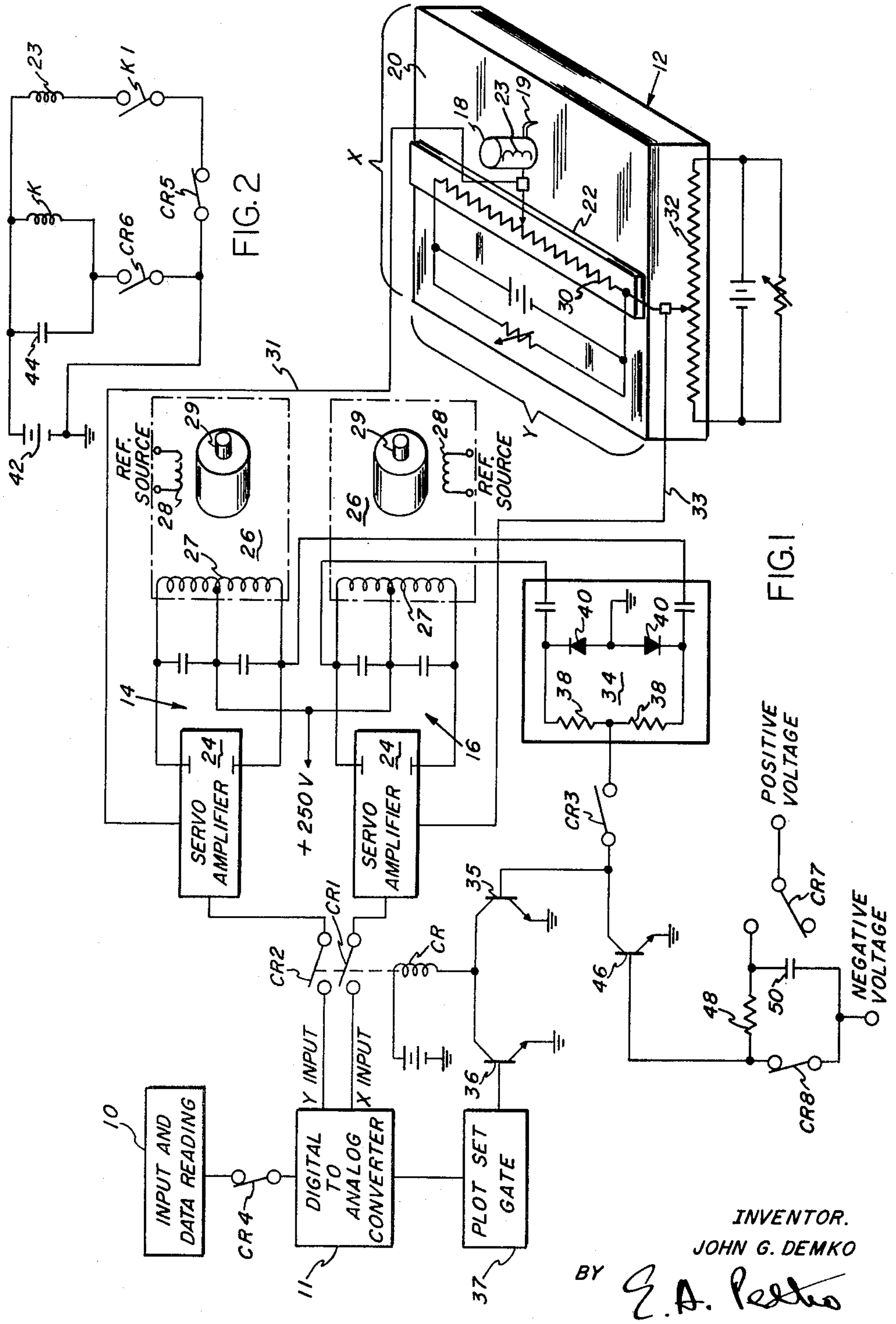

This invention relates generally to timing circuits and more particularly to a timing circuit for use with the servo system of a rectangular coordinate plotting device.

In the field of data reduction, it is common to present a rectangular coordinate graphical display of digital input data, which may be presented to the graphical display device on punched cards or on paper or magnetic tape in a binary-coded-decimal or straight-binary form. To achieve this end, it is customary to periodically sample or read the input data, decode it to equivalent incremental or discrete analog form, and then apply the discrete analog signals to the input terminals of servo systems provided within the rectangular coordinate plotting device. In turn, the servo systems drive a pen or other suitable plotting head and each sample digital signal is reduced to an individual graphical point plot.

Such systems may automatically process vast quantities of input data in each given "run" and the servo systems associated with the plotting head are usually arranged in such a manner that a null condition must be produced before a given point is plotted or before another sample of the input data is decoded and made available for reduction to a graphical form. Within a given "run," faulty input data, such as a point located external to the confines of the plotting surface, or a "noisy" plotting device, infrequently prevent the servo systems from driving to a null condition. Consequently, a "hung up" condition results which prevents the further automatic processing of that "run" of data until some sort of corrective action is put into effect. Since an operator is usually in attendance when data is being reduced, he can alleviate the "hung up" condition by rejecting faulty data through the removal of the faulty input card or by manually advancing the input tape. In the instance of a "hung up" condition as a result of excessive "noise," which condition may be a spurious one or one caused by inherent non-linearities within the servo systems, it is possible to rescale the graphical plot and start the data reduction anew or reduce the sensitivity of the servo system to produce generally inaccurate plots. Should the operator not be in attendance when a "hung up" condition occurs, there is the possibility of serious consequences, such as excessive wear or damage to the servo systems or to the mandrels associated with the plotting head.

The present invention is directed to a timing circuit for use with a rectangular coordinate plotting system which eliminates the "hung up" condition as described and permits continuous automatic reduction of data once a "run" has been initiated. A timing circuit, according to the preferred embodiment of the present invention, comprises means such as a relay which is energized in response to the presence of an input signal for completing a circuit between the signal source and the servo systems of the plotting device, a circuit for detecting a null condition at the servo systems and triggering the plotting head to a plotting position in response thereto, and means enabled by said relay for triggering the plotting head to the plotting position independently of the null circuit means after a predetermined timing period.

It is, therefore, an object of the present invention to provide circuit means for a rectangular coordinate plotting device which will automatically reject faulty input data which would otherwise produce non-automatic operation of the plotting device.

Another object of the present invention is to permit automatic graphical reduction of input data by a rectangular coordinate plotting device under conditions of faulty input data and/or excessive noise.

These and other objects, features and advantages will become apparent from the following description taken in connection with the accompanying drawings in which:

FIG. 1 shows schematically a preferred embodiment of the present invention comprising a timing circuit for a rectangular coordinate plotting device in which a hung-up condition is prevented; and FIG. 2 shows schematically an energizing circuit for the coil of the plotting head of FIG. 1.

In the drawing, a source of input data is shown to comprise a digital data input and reading apparatus 10 and digital-to-analog converting apparatus 11 for generating X nd Y output signals. The X and Y output signals may be D.C. and related in amplitude, voltage or current, to the digital input data which is to be reduced to a graphical plot at a plotting device 12. To this end, the X and Y input signals are applied to the input terminals of a pair of servo systems 14, 16 which drive a plotting head 18 and determine its physical position on the surface of the plotting board 12.

The plotting device 12 is of conventional form as described in the texts such as Basics of Analog Computers by Truitt and Rogers, Rider 1960, at page 3–20 et. seq. The device 20 includes a square or rectangular plotting surface 20 to which a suitable piece of paper, not shown, may be affixed. An arm 22 is disposed to overlie the surface 20 in a direction noted as Y and is adapted to be driven in a direction X, X axis of the surface 20, which is normal to the Y axis or Y direction of the surface 20 by servo system 16. The plotting head 18 is pivotally mounted on the arm 22 and driven along the length of the arm 22, Y direction or Y axis, by the servo system 14. Plotting head 18, which includes a suitable pen or scribe 19, may be moved pivotally under the control of a coil 23. In the energized condition of coil 23, it will be presumed that the pen or scribe of plotting head 18 is placed into engagement with the plotting surface 20 while in its de-energized condition, it will be presumed that the plotting head 18 is pivoted upwardly so as to lift the pen or scribe off the plotting surface.

The servo systems 14, 16 each include a similar servo amplifier 24 which includes a conventional differential input stage, not shown, and a conventional push-pull output stage which is connected to opposite ends of a control winding 27 for a servo motor 26. The servo motors 26 are of conventional form and are shown to comprise the control winding 27, a reference winding or field 28 which is connected to a fixed amplitude, fixed phase reference source, and a rotatable shaft member 29. The shaft member 29 of servo motor 26 in servo system 16, hereinafter generally referred to as the X axis servo system, is physically coupled to the arm 22 for moving it along the X axis of the plotting device 12. Similarly, the shaft member 29 of the servo system 14, hereinafter referred to as the Y axis servo system, is physically coupled to the plotting head 18 for moving it along the length of the arm 22, viz., along the Y axis of the plotting device 12.

The arm 22 may carry a linear potentiometer 30 which is disposed along its length and which is shown to have a source of potential connected to its ends and to have a parallax adjusting potentiometer which is similarly connected. The plotting head 18 is mechanically coupled to a brush or sliding contact of the potentiometer 30. A linear potentiometer 32 may be mounted along one edge of the X axis of the surface 20. A source of reference potential is connected to the ends of the potentiometer 32 and a parallax adjusting potentiometer is similarly connected. Arm 22 has a mechanical connection to the brush or sliding contact of potentiometer 32. A wire 31 provides a direct conenction from the brush or sliding contact of potentiometer 30 to the differential input stage of the Y axis servo amplifier 24 and a wire 33 provides a similar connection between the brush or sliding contact of potentiometer 32 and the X axis servo amplifier 24.

The system of graphical plotting thus far described is considered to be well known. Upon application of X and Y input signals, A.C. signals of appropriate amplitude and phase are developed at the control windings 27 to cause corresponding clockwise or counterclockwise rotation of shaft members 29. In turn, linear movement of plotting head 18 and arm 22 in one or an opposite direction results. Electrical feedback signals which correspond to the X and Y positions of plotting head 18 and arm 22 are delivered from the brushes of the potentiometers 30, 32 to the corresponding one of the differential input stages of amplifiers 24. The differential combination of the feedback signals and the input signals at the amplifiers 24 produces error signals for energization of the control windings 27. When the feedback signals from potentiometers 30, 32 are of exactly the same amplitude as the input signals from the data source 10 (within the accuracy limits of the servo systems) a null or quiescent condition of shaft members 29 is produced. At this time, auxiliary circuit means, not shown, may be triggered to momentarily energize the coil 23 and permit the plotting head 18 to produce an appropriate mark on the paper affixed to the surface 20. Energization of coil 23, in turn, may also effect the closure of a suitable contact, not shown, at the data source to permit the next succeeding "bit" of input data to be processed and produced as the next subsequent point plot.

In the prior art, noise within the servo systems or faulty input data which attempts to drive the plotting head 18 off the surface 20 produces a condition where the input signal cannot equal the feedback signal and it is accordingly impossible to achieve a null or quiescent condition at the servo systems. Accordingly, the coil 23 does not become de-energized and the data reduction system becomes "hung up." The remaining circuitry of FIG. 1 eliminates such occurrence and is shown to comprise a null sensing circuit, shown generally at 34, and a multipole control relay, the operating coil of which is shown at CR. The coil CR is operatively connected to the eight contacts CR1 through CR8. Contacts CR4, CR5 and CR8 are normally closed; the remaining five contacts are normally open.

The contacts CR1, CR2 are serially disposed in the pair of lines delivering input signals to the servo amplifiers 24 and thereby control the flow of input signals from the digital-to-analog converter 11. One side of coil CR is connected to a source of positive operating potential while the other side of coil CR is connected to one side of a pair of parallel connected switches 35, 36. The other side of switches 35, 36 have a common connection to ground. The switch 35 preferably comprises an NPN transistor which has a grounded emitter and which has a collector connected to the coil CR. The base of transistor 35 is connected to the null sensing circuit 34 via the normally open contact CR3. Switch 36 also preferably comprises an NPN transistor having a grounded emitter, a collector connected to coil CR, and a base circuit connection to the digital-to-analog converter 11. The base connection for transistor 36 includes a conventional plot-set gate 37. Gate 37 generates a momentary base biasing signal for the transistor 36 upon completion of a digital-to-analog conversion in response to an appropriate code or output signal which may be generated thereat, as is well known.

The null sensing circuit 34, according to the present invention, comprises a pair of similar serially connected resistors 38, 38 which have connected in parallel therewith a pair of similar diodes 40, 40. Diodes 40, 40 are connected in series opposition and are shown to have their respective anodes connected directly to ground. Each of the common junctures of a resistor 38 and a diode 40 are coupled respectively to one of the control windings 27.

The contact CR4 is disposed in series with the output from reading apparatus 10 and completes an input circuit to the digital-to-analog converter 11. The contact CR5 is disposed in a circuit for energizing the control head operating coil 23. The energizing circuit for coil 23 is shown adjacent to the plotting device 12 so as not to encumber the drawing in the vicinity of the plotting head 18. Coil 23 and its energizing circuit may be conveniently mounted upon and form an integral part of plotting head 18. As shown in the drawing, coil 23 is connected in series with the normally closed contact CR5 and a normally open contact K1. This series circuit is connected across a source of positive potential which is shown to comprise a battery 42 having its negative terminal connected to ground. A coil K for operating the contact K1 is connected in shunt to a capacitor 44; this circuit is connected in series with normally open contact CR6 and the battery 42.

A third NPN transistor has its collector connected directly to the base of transistor 35 and its emitter connected to ground. This transistor 46 receives a base input signal from a positive source of potential via an RC timing circuit and the normally open contact CR7. The RC timing circuit comprises a conventional series resistor 48 and shunt capacitor 50 which has one plate connected to a source of negative voltage. The common juncture of resistor 48 and capacitor 50 is connected directly to the contact CR7. The other end of resistor 48 is connected directly to the base of transistor 46. The circuit of the present invention is completed by the connection of the normally closed contact CR8 between the output end of resistor 48 and the course of negative potential.

In operation, upon completion of a data conversion at the converter 11, a signal is applied to the gate 37 and transistor 36 is caused to conduct. Coil CR is in turn energized and contacts CR1, CR2 apply the output from converter 11 directly to the X and Y servo amplifiers 24. Contact CR4 is opened to prevent further input signals to converter 11 and contact CR3 is closed to establish a circuit between the null sensing circuit and the base of transistor 35. Conduction of transistor 35 maintains the energizing circuit for coil CR after transistor 36 ceases to conduct. The servo systems for the X and Y axes immediately generate error signals which are applied directly to the null sensing circuit 34. The input signals applied to the pull sensing circuit are sine waves which are rectified at the diodes 40 such that only their positive halfwave portions are combined additively at the resistors 38, 38 for providing a biasing signal for the base of transistor 35.

In the normal and usual operation of the system thus far described, the output signal from null sensing circuit 34 will decay to zero when the error signals at the control windings 27 decay to zero. So long as one or the other of the windings 27 produces an error signal, there is a positive output signal from null sensing circuit 34. When, however, a null condition is produced at the X and Y axes servo systems, there is zero output from null sensing circuit 34, transistor 35 ceases to conduct, and the coil CR is de-energized. When coil CR becomes de-energized, it disconnects the servo amplifiers 24 from the converter 11, disconnects the base of transistor 35 from the null sensing circuit 34 and simultaneously closes contact CR4 in order to automatically provide new input data for the converter 11 so that the process of data reduction may automatically continue.

When the contact CR6 is closed upon energization of coil CR, the coil K is energized by the battery 42 to close its contact K1. Although contact K1 is closed, coil 23 remains de-energized because the contact CR5 is then open. Subsequently, when coil CR is de-energized, the contact CR5 will close and the contact CR6 will open. During the period when coil K is energized, the capacitor 44 is permitted to charge. When contact CR6 is subsequently opened, capacitor 44 will discharge and maintain coil K energized for a short period of time. During the period when capacitor 44 is discharging, the contact K1 and contact CR5 are closed to permit momentary energization of the coil 23 and momentary engagement of pen 19 with the plotting surface to produce a point plot.

The timing circuit comprising resistor 48 and capacitor 50 is so arranged that it will "time out," viz., a positive signal will be applied to the base of transistor 46, within a period of time selected to correspond to the maximum time required for plotting head 18 to complete a maximum expected traverse of the plotting surface 20. By way of example, the timing period for this RC circuit may be two seconds. If a null or quiescent condition is not produced at the X and Y servo systems within this period of time, the positive input signal is applied to the base of transistor 46 via the contact CR7 and resistor 48 to bias it to a condition of conduction. When transistor 46 conducts, the base of transistor 35 is effectively connected to ground and ceases to conduct. The coil CR is de-energized, thereby permitting the further processing of digital information at the converter 11. When coil CR is de-energized, coil 23 is triggered to produce a point plot. Upon de-energization of the coil CR, the contact CR8 is actuated to a closed position in order to discharge the capacitor 50 and re-establish the RC timing period for transistor 46.

It is to be noted that transistor 46 will not conduct unless the X and Y servo systems fail to produce a null or quiescent condition prior to the expiration of the RC timing period. This circuit will function only to prevent the "hung up" condition heretofore described. Whether or not the transistor 46 is biased to conduction is dependent upon the quality of the input data and upon the "noise" present at the plotting device. Capacitor 50 will be discharged each time that coil CR is de-energized to reset this circuit after each plot.

While only one embodiment of the present invention has been herein shown and described, it will be understood that this invention is subject to many variations, modifications, and reversals of parts. It is therefore intended that all matter contained herein shall be interpreted as illustrative and not in a limiting sense.

I claim:

1. A timing circuit for a rectangular coordinate plotting device including a plotting surface, a plotting head triggerable to a position for producing on said surface a visual record of sampled discrete input signals from a source, a pair of servo systems for driving said plotting head in one direction and in a direction normal to said one direction comprising, means energized in response to the presence of an input signal from said source for completing a circuit between said source and said servo systems whereby said servo systems each seek a null condition for each of said discrete input signals, circuit means for detecting said null condition at both said servo systems for de-energizing said circuit completing means, and means including an RC network connected to said circuit completing means and enabled upon energization of said circuit completing means for de-energizing said circuit completing means independently of said null circuit means after a predetermined time delay thereby to prevent a "hung-up" condition in which said null condition is not reached at both of said servo systems for a discrete input signal.

2. A timing circuit for a rectangular coordinate plotting device including a plotting surface, a plotting head triggerable to a position for producing on said surface a visual record of sampled discrete input signals related to digital data from a source, a pair of servo systems for driving said plotting head in one direction and in a direction normal to said one direction comprising, means energized in response to the presence of an input signal from said source for completing a circuit between said source and said servo systems whereby said servo systems each seek a null condition for each of said discrete input signals, circuit means for detecting a null condition at both of said servo systems for de-energizing said circuit completing means, and means including an RC network connected to said circuit completing means and enabled upon energization of said circuit completing means for de-energizing said circuit completing means independently of said null circuit means after a predetermined time delay thereby to prevent a "hung-up" condition in which said null condition is not reached at both of said servo systems for a discrete input signal.

3. A timing circuit for a rectangular coordinate plotting device including a plotting surface, a plotting head triggerable to a position for producing on said surface a visual record of sampled discrete input signals related to digital data from a source, a pair of closed-loop servo systems for driving said plotting head in one direction and in a direction normal to said one direction comprising, means energized in response to the presence of an input signal from said source for completing a circuit between said source and said servo systems whereby said servo systems each seek a null condition for each of said discrete input signals, circuit means for detecting a null condition at both of said servo systems for de-energizing said circuit completing means, and means including an RC network connected to said circuit completing means and enabled upon energization of said circuit completing means for de-energizing said circuit completing means independently of said null circuit means after a predetermined time delay thereby to prevent a "hung-up" condition in which said null condition is not reached at both of said servo systems for a discrete input signal, said means including an RC network being disabled and thereby rendered ineffective upon de-energization of said circuit completing means.

4. A timing circuit for a rectangular coordinate plotting device including a plotting surface, a plotting head triggerable to a position for producing on said surface a visual record of sampled discrete input signals from a source, a pair of closed-loop servo systems for driving said plotting head in one direction and in a direction normal to said one direction comprising, means energized in response to the presence of an input signal from said source for completing a circuit between the source and said servo system whereby said servo systems seek a null condition for each of said discrete input signals, circuit means for detecting a null condition at both of said servo systems and for de-energizing said circuit completing means in response thereto, means triggering said plotting head upon de-energization of said circuit completing means, means including an RC network connected to said circuit completing means and enabled upon energization of said circuit completing means for de-energizing said circuit completing means independently of said null circuit means after a predetermined time delay thereby to prevent a "hung-up" condition in which said null condition is not reached at both of said servo systems for a discrete input signal, and means coupled to said means including an RC network and rendering it ineffective upon de-energization of said circuit completing means.

5. A timing circuit for a rectangular coordinate plotting device including a plotting surface, a plotting head triggerable to a position for producing on said surface a visual record of a sampled discrete input signal from a source, a pair of closed-loop servo systems for driving said plotting head in one direction and in a direction normal to said one direction comprising, switch means momentarily energized in response to the presence of an input signal from said source, means energized in response to the energized condition of said switch means for completing a circuit between the source and said servo systems whereby said servo systems seek a null condition for each of said discrete input signals, circuit means for detecting a null condition at both of said servo systems to maintain energized said circuit completing means until a null condition exists at both of said servo systems, means triggering said plotting head upon de-energization of said circuit completing means, means including an RC network connected to said circuit completing means and energized upon energization of said circuit completing means for de-energizing said circuit completing means after a predetermined time delay thereby to prevent a "hun-up" condition in which a null condition at both of said servo systems is not reached for a discrete input signal, and switch means coupled to said means including an RC network and operated by said circuit completing means for rendering said means including an RC network ineffective upon de-energization of said circuit completing means.

6. A timing circuit for a rectangular coordinate plotting device having a plotting surface comprising a plotting head triggerable for producing on said surface a record of discrete input signals from an input source, at least one pair of servo systems for driving said plotting head, switching means operable in response to an input signal from said input source for completing a circuit between said input source and said servo systems whereby said servo systems each seek a null condition for each input signal, means for detecting a null condition at both of said servo systems for operating said switching means to open said circuit between said input source and said servo systems, delay means responsive to said switching means completing said circuit for producing a switching signal a predetermined time interval after said circuit has been completed, and means connected to said delay means and to said switching means for operating said switching means in response to said switching signal to open said circuit independently of said null detector means thereby to prevent a "hung-up" condition.

References Cited in the file of this patent

UNITED STATES PATENTS

| | | |
|---|---|---|
| 2,651,400 | Young et al. | Sept. 8, 1953 |
| 2,661,260 | Salzman | Dec. 1, 1953 |
| 2,787,511 | Ehret | Apr. 2, 1957 |
| 2,907,011 | Kuder | Sept. 29, 1959 |
| 2,937,913 | Boyle | May 24, 1960 |
| 2,973,238 | Herzog | Feb. 28, 1961 |
| 2,977,177 | McLaughlin et al. | Mar. 28, 1961 |
| 3,013,855 | Lapinski et al. | Dec. 19, 1961 |